United States Patent

[11] 3,617,529

| [72] | Inventors | William H. Thompson<br>St. Louis, Mo.;<br>Eldred E. Young, Concord, Calif. |
|---|---|---|
| [21] | Appl. No. | 808,002 |
| [22] | Filed | Mar. 17, 1969 |
| [45] | Patented | Nov. 2, 1971 |
| [73] | Assignee | Shell Oil Company<br>New York, N.Y. |

[54] REMOVAL OF ELEMENTAL SULFUR CONTAMINANTS FROM PETROLEUM OILS
2 Claims, No Drawings

[52] U.S. Cl.................................................. 208/230,
23/224, 302/14
[51] Int. Cl......................................................... C10g 19/02
[50] Field of Search............................................ 208/226,
230, 283, 227, 108, 177, 208, 228; 302/14

[56] References Cited
UNITED STATES PATENTS

| 1,413,005 | 4/1922 | Cobb............................ | 208/226 |
| 3,474,028 | 10/1969 | Bulian et al................... | 208/230 |
| 2,798,772 | 7/1957 | Redcay.......................... | 302/14 S |

*Primary Examiner*—Delbert E. Gantz
*Assistant Examiner*—G. J. Crasanakis
*Attorneys*—G. G. Pritzker and J. H. McCarthy ABSTRACT: Elemental sulfur is separated from oil containing 0.3-5 percent elemental sulfur, the oil being used as the carrier vehicle for pipeline transportation of sulfur-oil slurries. The contaminated oil is contacted with an aqueous solution containing a mixture of sodium hydrosulfide and ammonium hydroxide; the oil phase is separated from the aqueous phase; the aqueous phase is heated at about 240° F. to form elemental sulfur and the aqueous phase is filtered after cooling to recover sulfur.

REMOVAL OF ELEMENTAL SULFUR CONTAMINANTS FROM PETROLEUM OILS

BACKGROUND OF THE INVENTION

It is well known in the art that very small amounts of naturally occurring elemental sulfur and sulfur compounds are present in petroleum oils or are formed due to chemical refinement of oils, such as by sulfuric acid treatment of oils, and that these sulfur and sulfur compounds can be effectively removed by chemical processing such oils with ammonia or alkali compounds, e.g., alkali metal hydroxide, as evidenced by reference to U.S. Pat. Nos. 1,300,816; 1,413,005; 1,423,712; 1,974,724; 1,974,725; 3,185,641 and 3,250,697. However, these methods or other related methods known in the art are either ineffective or are quite costly for removing elemental sulfur from oils which have been contaminated with large amounts (0.3–5 percent or 0.5–1.5 percent) of elemental sulfur. Oil contaminated with such large amounts of elemental sulfur must be effectively treated to remove essentially all of the entrained sulfur prior to processing these oils into industrial products such as gasoline, fuel oils, lubricating oils, etc. Also, the presence of sulfur in these products causes corrosion, objectionable odors, air pollution, etc., and therefore its removal is essential. Oils can become contaminated with such large amounts of elemental sulfur as when such oils are used as carrier vehicles in pipeline transportation of sulfur as described in the Redcay U.S. Pat. No. 2,798,772, or in the copending U.S. Pat. application Ser. No. 663,755, filed Aug. 28, 1967 which matured as U.S. Pat. No. 3,443,837. Although these references, e.g., the Redcay patent, describe methods of separating the oil from the sulfur at the terminal end and thereafter purifying by chemical means the sulfur by removing any dissolved or entrained oil therefrom, no mention is made of purifying the carrier, namely the oil, which can be recycled and reused as a sulfur carrier without further purification. Available art is lacking on suggesting means for purifying oil carriers used in pipeline transportation of sulfur as a sulfur-oil slurry.

An object of the present invention is directed to a process for removing sulfur from sulfur-contaminated oils.

Still another object of the present invention is directed to a process for removing elemental sulfur from elemental sulfur-contaminated petroleum oil.

Also, it is an object of the present invention to purify crude oil and fractions thereof by chemically treating the oil and fractions thereof with a reactive aqueous solution capable of extracting from the oil any entrained or dissolved elemental sulfur present therein.

Other objects will become apparent during the following discussion of the invention.

SUMMARY OF THE INVENTION

Now in accordance with the present invention it has been found that elemental sulfur can be separated effectively from crude oil and fractions thereof containing less than about 5 percent, and generally between about 0.5 and 1.5 percent of elemental sulfur, by contact such contaminated oils with an aqueous solution containing sodium hydrosulfide or a mixture of sodium hydrosulfide and sodium hydroxide and/or ammonium hydroxide, for a period of time and under controlled temperature conditions to effect a reaction between the elemental sulfur dispersed or solubilized in the oil and the alkali compounds present in the aqueous solution so that on separation of the oil phase from the aqueous phase, the sulfur has been transferred in the latter phase where it is present as a polysulfide. The elemental sulfur, if desired, can be recovered therefrom by decomposition of the polysulfide by any suitable means and the purified sulfur-free oil can be used thereafter or processed if necessary, as desired.

By the process of this invention, elemental sulfur-contaminated oils having a sulfur content of from about 1 to about 2 percent can be reduced to values of less than 0.01 percent sulfur, or even less. It is to be clearly understood that the process of the present invention effectively removes elemental sulfur contaminants from oils and that the indigenous sulfur in chemical forms in the oil other than the elemental form before becoming contaminated with elemental sulfur is unaffected by the contacting aqueous solution of the present invention.

The ratio of the oil to the contacting or treating aqueous solution can be varied over wide limits of from 20:1 to 1:20 and preferably between 10:1 and 5:1, respectively, and the treatment can be carried out at ambient temperatures or elevated temperatures, but preferably below 200° F. The aqueous phase can be separated from the oil phase by any suitable means, such as gravity settling, centrifuging, etc. The alkali polysulfide solution recovered can be decomposed by suitable means such as in a closed vessel or under nitrogen blanket to exclude air to recover elemental sulfur. Thus, on heating at elevated temperatures liquid or granular solid yellow sulfur can be precipitated from the solution and thereafter removed. When necessary or desirable, the treated oil can be further contacted with additional amounts of the aqueous treating solution to effect removal of any sulfur which has not been removed by the initial treatment and the process can be repeated as necessary until essentially all of the entrained and dissolved elemental sulfur is removed. Thus, a sulfur-contaminated oil can be treated by the process of this invention so that the sulfur content of the treated oil is below about 0.01 percent and such oils can be safely processed in refineries to produce industrial products such as gasoline and lube oils, etc.

PREFERRED EMBODIMENT OF THE INVENTION

To summarize, the steps in removing elemental sulfur present as contaminates in oil comprises:

1. contacting or treating the elemental sulfur-contaminated oil with an aqueous solution containing sodium hydrosulfide or an aqueous solution containing a mixture of sodium hydrosulfide with sodium hydroxide and/or ammonium hydroxide, said solutions having a pH of at least 7, and the solutions are preferably used at ambient temperature for a period of time sufficient to effect a reaction between the elemental sulfur and the alkali compounds in the aqueous solution;
2. separating the oil phase from the aqueous phase and further treating the separated oil phase if necessary by the process of step 1;
3. optionally treating the separated aqueous phase containing formed polysulfides, as a result of the reaction of step (1), to effect a breaking down of the polysulfides to elemental sulfur, and other by-products and
4. removing the sulfur by filtration, centrifuging, gravity settling, etc.

The oil purification of sulfur-contaminated crude oil is illustrated by the following example.

Crude oil used as a carrier vehicle in pipeline transportation of solid sulfur particles in slurry form was separated from the sulfur at the terminal end of the line by conventional means and found to contain about 1.0 to 1.5 percent elemental sulfur entrained in the oil. About 10 parts of the sulfur-contaminated crude oil was contacted with about 1 part of a saturated aqueous solution having a pH above 7 containing a mixture of sodium hydrosulfide and ammonium hydroxide at ambient temperature for about 1–2 hours. After about one-half hour of contacting the oil phase on separation from the aqueous phase was found to contain about 0.01 percent sulfur. The aqueous phase, after separation from the oil phase, can be heated to about 250° F. under a nitrogen blanket to form elemental sulfur, which can be recovered from the solution after cooling by filtration.

Crude oil containing 1–2 percent elemental sulfur resulting from sulfur-oil slurry separation was also treated with (1) a saturated aqueous solution containing sodium hydrosulfide and (2) a saturated solution containing a mixture of sodium hydrosulfide and sodium hydroxide and in each case the elemental sulfur content of the crude was reduced to less than 0.01 percent by this process.

The process of the present invention is particularly applicable to recovering and refining crude oil and fractions thereof used as carrier vehicles in pipeline transportation of sulfur-oil slurries such as described in copending application, Ser. No. 663,755 which matured as U.S. Pat. No. 3,443,837 and as a result of which the oils become contaminated with elemental sulfur which must be removed prior to refinery processing in order to produce industrial products such as gasoline, fuel oil, lubricating oil and other industrial products.

The foregoing description of the invention is merely intended to be explanatory thereof. Various changes in the details of the described method may be made within the scope of the appended claims without departing from the spirit of the invention.

We claim as our invention:

1. A method of separating elemental sulfur from contaminated crude oil containing from 0.3 to 5 percent elemental sulfur, said oil being separated from a sulfur-crude oil slurry, said method comprising:
   a. contacting said sulfur-contaminated crude oil with an aqueous solution containing a mixture of sodium hydrosulfide and ammonium hydroxide having a pH above 7.
   b. separating the sulfur-free crude oil phase from the sulfur-containing aqueous phase;
   c. heating the sulfur-containing aqueous phase of (b) at about 240° F. to form elemental sulfur, and
   d. filtering said aqueous phase after cooling to recover sulfur therefrom.

2. A method of pipeline-transporting a sulfur-crude oil slurry over great distances and at the terminal end of the pipeline separating the sulfur-crude oil slurry into its component parts and purifying the sulfur-contaminated oil component the steps comprising:
   a. forming a sulfur-oil slurry by injecting molten sulfur into oil;
   b. injecting slurry (a) into a pipeline and transporting said slurry to a terminal station;
   c. separating the sulfur phase from the oil contaminated with up to 5 percent elemental sulfur;
   d. treating the separated sulfur-contaminated oil of phase (c) with an aqueous solution containing a mixture of sodium hydrosulfide and ammonium hydroxide and having a pH of at least 7;
   e. separating the essentially sulfur-free crude oil phase from the aqueous phase;
   f. heating the aqueous phase (e) to about 240° F. to form elemental sulfur, and
   g. filtering said aqueous phase after cooling to recover sulfur therefrom.

* * * * *